Nov. 3, 1964　　D. D. CAMPBELL ETAL　　3,155,204
WINDSHIELD MOUNTING
Filed Feb. 5, 1962　　　　　　　　　　2 Sheets-Sheet 1
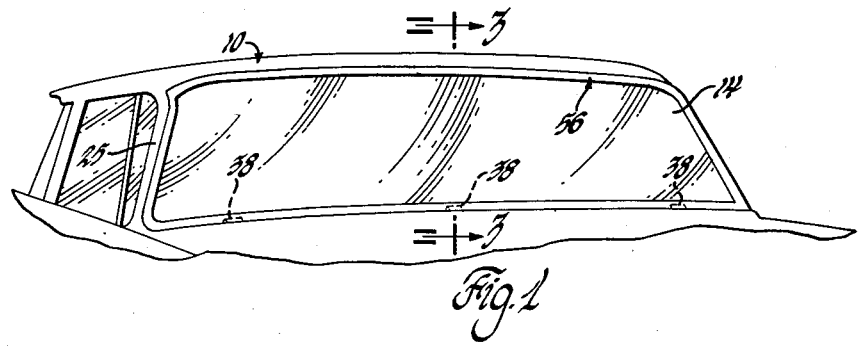
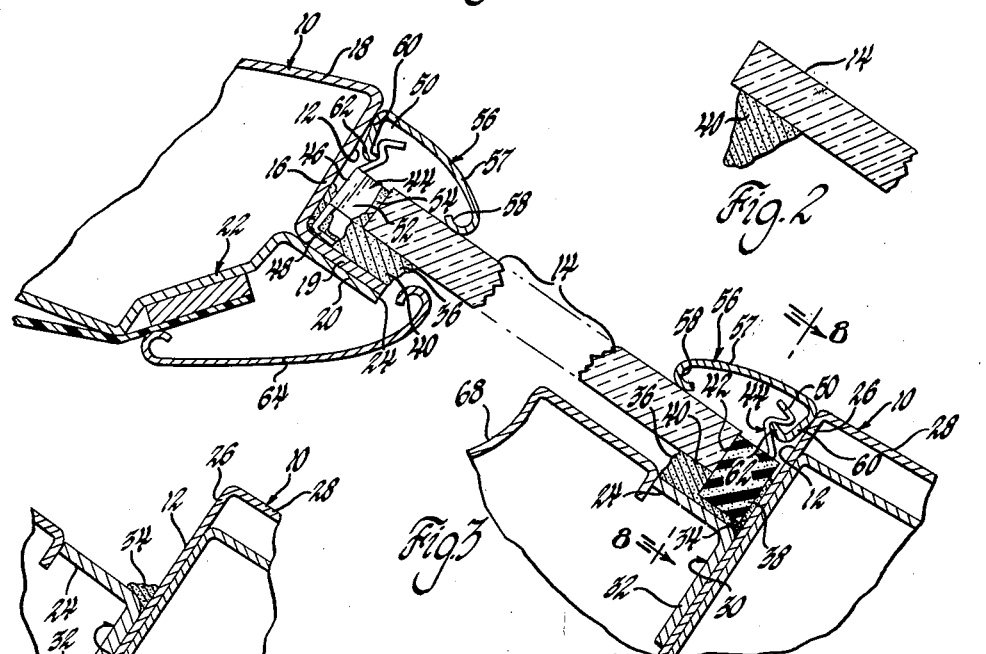
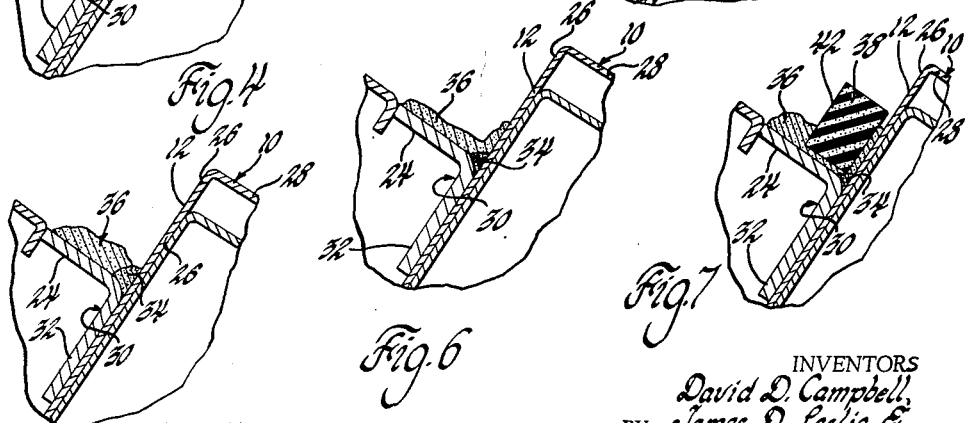
INVENTORS
David D. Campbell,
BY James D. Leslie, &
James H. Wernig
Herbert Furman
ATTORNEY

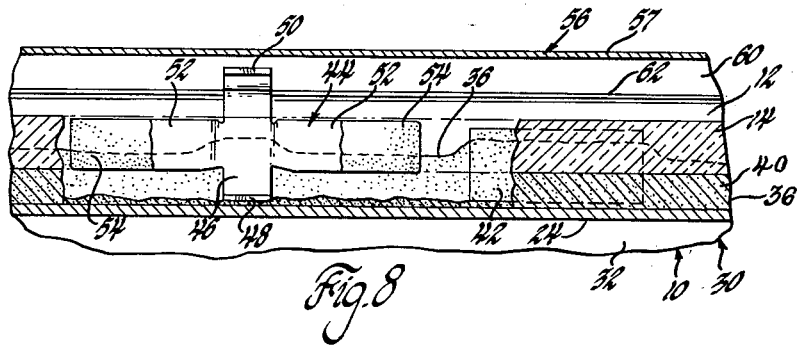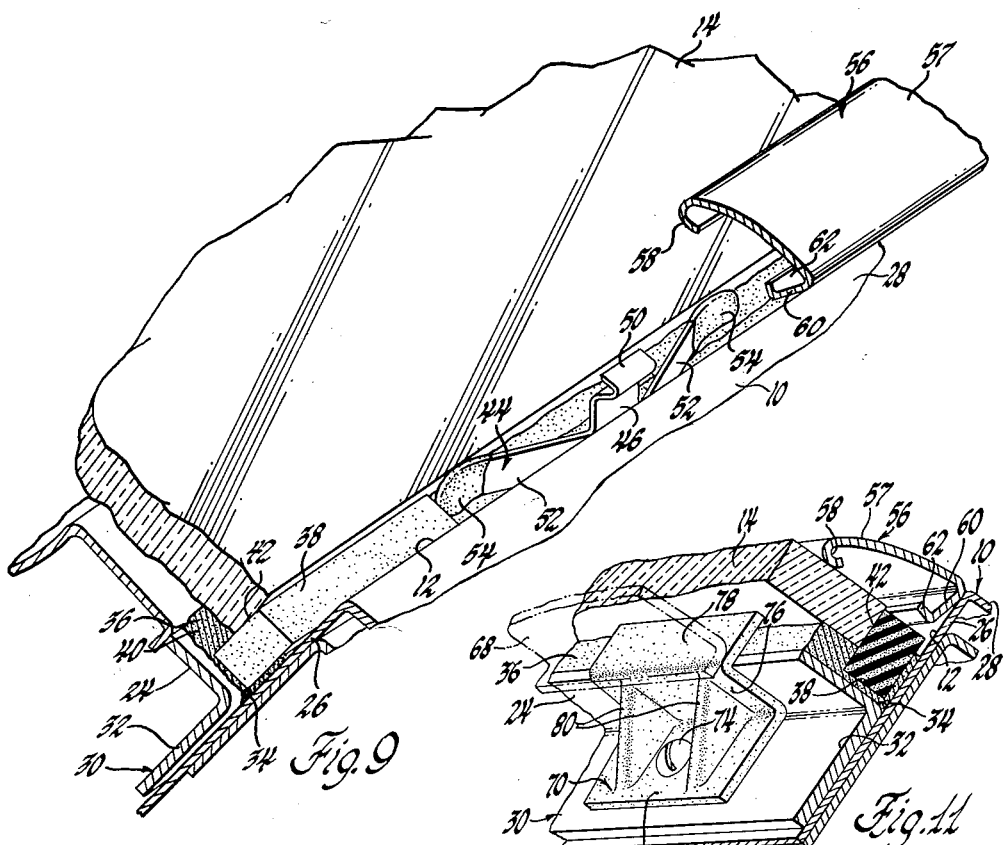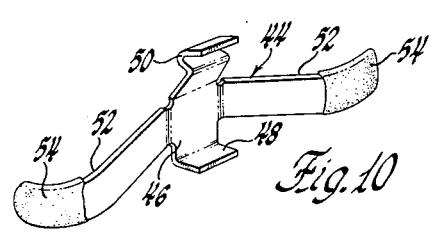

United States Patent Office 3,155,204
Patented Nov. 3, 1964

3,155,204
WINDSHIELD MOUNTING
David D. Campbell, James D. Leslie, and James H. Wernig, all of Birmingham, Mich., assignors to General Motors Corporation, Detroit, Mich., a corporation of Delaware
Filed Feb. 5, 1962, Ser. No. 170,963
6 Claims. (Cl. 189—77)

This invention relates to vehicle bodies and more particularly to a method of and means for mounting transparent panels such as windshields or backlites on vehicle bodies.

At the present time, fixed vehicle windows, such as windshields or backlites, are mounted on the body by means of weatherstrips having oppositely opening continuous channels, one of which receives the edge portion of the window and the other of which receives the body flange extending generally parallel to the plane of the body window opening and generally normal to the body wall which defines the window opening. This manner of mounting fixed vehicle windows on bodies has been widely used for many years.

However, such a manner of mounting fixed vehicle windows on bodies presents certain problems with regard to sealing of the body against the entry of moisture. Although the body flange is generally continuous, this flange is comprised of a number of body parts and accordingly various portions of the flange may be out of line with adjacent portions due to production variations so as to tend to twist or distort the weatherstrip and thereby increase the possibility of moisture entry into the body along the body wall and over the flange. Further, with the advent of the wrap-around type windshield, the sealing problems are increased due to the multiple curvature of the body flange and of the glass.

The method of and means for mounting transparent panels of this invention are easily adaptable to modern vehicle body production methods and virtually ensure there will be no moisture leakage into the body. Further, the subject method of and means for mounting windshields and backlites is interchangeable at will with the usual present practice since no change need be made in the body structure or in the manner in which the various parts of the body which make up the window opening are secured together.

In the preferred embodiment of the invention, a primer is first applied to the body flange and to the body wall adjacent the flange to clean these surfaces and to also soften and increase the porosity of the paint previously applied thereto. A bead of curable adhesive material is then applied to the body flange and leveled to provide a uniform layer of adhesive material on the body flange. During the leveling of the bead of adhesive material, it is spread out so as to cover the radius or joint between the body flange and the body wall and to also partially cover the body wall immediately adjacent the body flange. This step is necessary since the adhesive material is not particularly flowable and accordingly it is difficult to obtain a uniform layer and to also apply the adhesive material to the joint between the body flange and wall and to the body wall adjacent the body flange.

A plurality of generally rectangularly shaped spacer blocks are then embedded in the layer of adhesive material along the bottom edge portion of the window opening. Although the blocks are pushed into the layer of adhesive material, a film of adhesive material is still left between the walls of the block juxtaposed to the body flange and to the body wall. The upper wall of the block is located below the edge of the body flange so as to leave an area of the flange covered with the layer of adhesive material. Suitable locating fixtures to space the inner surface of the window panel with respect to the body flange are then mounted on the body across the window opening.

A suitable wetting agent is applied to the inner surface of the window panel adjacent the edge portion thereof to ensure excellent cohesion between this area of the panel and the bead of curable adhesive material which is thereafter applied thereto. This bead is generally of triangular cross section. The panel is then placed in a suitable window jig or fixture and located generally angularly to the plane of the window opening, with its lower edge portion resting on the upper walls of the spacer blocks. The panel is then rotated inwardly of the opening so as to bring the bead of adhesive material on the panel into engagement with the layer of adhesive material on the body flange, both intermediate and above the rubber blocks. By applying a bead of adhesive material of triangular cross section to the window panel, a continuous bead of adhesive material between the body flange and the window panel is ensured entirely around the window opening.

Thereafter suitable clamps between the body pillars and the window panel are applied to hold the window panel against the locating fixtures which have been previously applied across the window opening of the body and thus locate the window panel with respect to the body flange. The window jig or fixture is then removed.

A plurality of clips are then inserted in the space between the edge portion of the panel and the body wall. These clips generally include a body or base portion bearing against the body wall and the body flange and being partially embedded in the layer of adhesive material thereon. The wing flanges or legs of the clips, which extend oppositely from the body or base portion, bear against the edge portion of the panel. Thereafter the adhesive material is cured, either by normal ambient temperature or by accelerated heat curing, the locating fixtures and the clamps are removed, and the window garnish and reveal moldings are then mounted on the body. The reveal moldings are of the rotative type and are held in place by suitable molding attachment means provided on the bodies of the clips.

The method of and means for mounting transparent panels on vehicle bodies provided by this invention has several distinct and important advantages over present day practices. One advantage is in the elimination of window panel strain breaks by permitting the custom installation of each individual panel to each individual body opening regardless of the production tolerances and variations of either the panel or the body opening. This is important in the mass production of vehicle bodies. Such custom installation avoids localized stresses in the panel which often lead to glass breakage problems and resultant required replacement of the panel. The warranty cost to the manufacturer and costs to the operator of the vehicle are thus reduced to a minimum. Another advantage is in the sealing of the entire periphery of the panel to the body opening to virtually negate the possibility of water leaks. Additional sealing operations, such as the applying of various sealers within the channels of present day weatherstrips, are also eliminated. A further advantage is in the reduction of both material costs and installation time as compared to present day practices and materials. Yet another advantage is in service replacement of the panel. Any replacement panel will also be custom fitted to the body opening regardless of the production variations of the replacement panel and of the body opening. The ease of installation reduces the replacement time to a minimum while water leakge problems and additional sealing operations are eliminated as hereinbefore noted. Yet a further advantage is in the improvement of body appearance due to the fact that the elimination of the presently used weatherstrip eliminates various appearance problems which result from portions of the weatherstrips being visible from both the interior and exterior of the body. The weatherstrips are usually colored black and problems are often encountered in concealing the weatherstrips so as to enhance the body appearance.

The primary object of this invention is to provide a new and improved method of and means for mounting transparent closures on vehicle bodies.

This and other objects of this invention will be readily apparent from the following specification and drawings wherein:

FIGURE 1 is a partial front perspective view of a vehicle body having a windshield mounted thereon according to this invention;

FIGURE 2 is a cross sectional view of the edge portion of the windshield having a bead of adhesive material applied thereon prior to installation of the windshield on the body;

FIGURE 3 is an enlarged sectional view taken generally along the plane indicated by line 3—3 of FIGURE 1;

FIGURE 4 is a view of a portion of FIGURE 3 showing an initial step in the method of this invention;

FIGURE 5 shows a succeeding step;

FIGURE 6 shows a succeeding step;

FIGURE 7 shows a succeeding step;

FIGURE 8 is a partially broken away view taken generally along the plane indicated by line 8—8 of FIGURE 3;

FIGURE 9 is a partially broken away perspective view of the lower portion of the windshield opening after installation of the windshield;

FIGURE 10 is a perspective view of a clip, and;

FIGURE 11 is a perspective view of a modification.

Referring now to the drawings, a vehicle body 10 includes a generally continuous body wall 12 defining a windshield opening which is adapted to be closed by a windshield 14. A lateral flange 16 of the roof panel 18 provides the wall 12 along the upper edge portion of the windshield opening and merges into a laterally extending flange 19 which is joined to a similar flange 20 of the body header 22 to form a pinchweld flange and provide the continuous body flange 24 along the upper edge portion of the windshield opening. Flange 24 extends generally parallel to the plane of the windshield of the windshield opening defined by wall 12. The body wall 12 and body flange 24 along the side edge portions of the windshield opening are defined by flanges of the body pillars 25 in a conventional manner. Along the lower edge portion of the windshield opening, wall 12 is defined by a lateral flange 26 of the body cowl panel 28. An angle member 30 has one leg 32 thereof secured to the flange 26 of the cowl panel and the other leg thereof extending generally parallel to the plane of the window opening and providing the body flange 24 along the lower edge portion of the windshield opening. Body structure such as hereinbefore described is common in present and past vehicle bodies and although various details of the body parts have not been shown and described, they are known to persons skilled in this art. It will be understood that in certain body structures, the body flange may be formed in other ways, such as being part of the body wall, and accordingly, this invention is not limited to a flange formed in the particular manner described herein. Generally, this invention may be successfully practiced in mounting a windshield or backlite or other fixed windows on a vehicle body as long as the body includes a first wall extending laterally to the plane of the opening and a second wall extending parallel to the plane of the opening.

In present practice, the bodies are completely painted prior to the installation of either the windshield or the backlite. Since the painting operation generally includes several spraying and sanding steps, the installation of the fixed vehicle windows is best done after the body is painted. After the body is painted, a bead 34 of plastisol sealer is applied, as shown in FIGURE 4, at the juncture of the member 30 and the flange 26 of the cowl panel to seal the member 30 to the cowl panel. The bead 34 is applied only along the lower edge portion of the windshield opening since the member 30 is not used in other areas of the opening.

A primer is then applied to the body flange 24 and to the body wall 12 in order to clean these surfaces of any debris which results from the painting operations and to further soften the paint adhered to these surfaces so that the paint becomes porous. A suitable primer for acrylic lacquer paints is a solution of 5% chlorinated rubber and 95% toluene.

Thereafter, as shown in FIGURE 5, a bead 36 of curable adhesive material is applied to the body flange 24 continuously around the windshield opening. In the specific embodiment of the invention, shown and described herein, the adhesive material used is commercially available under the trade name of "Weatherban." This material is a polysulfide base material having suitable fillers and solvents added thereto. It is heat curable and when cured, exhibits the properties of rubber in that it is capable of accepting shear stress, will not crack or corrode in various climates, and will wet both glass and painted metal. The latter property is important in order to ensure a continuous bond between the body flange 24 and the window panel as will be apparent from a further description.

As shown in FIGURE 6, the bead 36 of adhesive material is then leveled so as to provide a layer of the adhesive material of generally uniform thickness on the flange 24. By leveling the adhesive material on this flange, any imperfections or pits in the flange are effectively taken care of. During leveling, the adhesive material is spread out over the juncture area between the body flange 24 and the body wall 12, over a portion of the body wall 12 adjacent the body flange 24, and over the bead 34, as shown. Since the adhesive material is not particularly flowable, this leveling and spreading out of the bead 36 ensures a continuous generally uniform layer of adhesive material over the body flange and a portion of the body wall. The primer previously applied to the wall 12 and flange 24 to soften the paint, increases the adhesion between the bead 36 and the paint.

Thereafter, as shown in FIGURE 7, a plurality of blocks 38 of rubber of generally rectangular shape are embedded in the layer of adhesive material along the lower edge portion of the windshield opening. As shown, although exaggerated for purposes of clarity, a thin film or layer of adhesive material will be left between the surface of the block adjacent the surface of the flange 24 and the surface of the block adjacent the body wall 12 for sealing and retention purposes. In the specific embodiment shown herein, FIGURE 1, three such blocks are used along the lower edge portion of the windshield opening, with two of the blocks being located adjacent the lower side corners of the windshield opening and the third block being located substantially at the center line of the body. However, the blocks may be otherwise located if desired and also more or less blocks may be used if so desired.

Prior to any installation of the windshield 14 on the body, it is placed in a suitable windshield jig or fixture and the inner surface of the windshield, adjacent the edge portion thereof, is primed with a wetting agent, such as a solution of Silane, to ensure good adhesion between the windshield and the bead 40 of adhesive material thereafter applied to the windshield in this area, as shown in FIGURE 2. In the specific embodiment described herein, a 2% solution of Silane is used, and this is available from the B. F. Goodrich Company under No. A934B. The bead 40 is preferably of triangular cross sectional shape, and the adhesive material used is the same as that applied to the body flange 24, as previously described herein.

Suitable locating jigs or fixtures are applied to the body inwardly of the windshield opening, with these jigs or fixtures including vertically spaced buttons or other suitable spacer means to locate the windshield 14 with respect to the flange 24 as will be hereinafter described.

In order to install the windshield 14 on the body, it is either placed in a windshield jig or fixture, or the same windshield jig or fixture in which it was placed to apply the bead 40 of adhesive material may be used, and this jig or fixture is then located either by pilot holes in the cowl panel 28 or by other body fixtures or jigs so as to locate the windshield 14 generally angularly and outwardly of the windshield opening with the lower edge portion of the windshield resting on the upper walls or surfaces 42 of the blocks 38. Thereafter, the windshield jig or fixture is rotated inwardly of the windshield opening to rotate the windshield 14 inwardly of the windshield opening about its lower edge portion and thereby bring the bead 40 of adhesive material on the windshield into contact with the layer 36 of adhesive material on the body flange 24. The bead 40 will be deformed when it engages the layer 36 and by making the bead 40 of generally triangular cross sectional shape, a continuous uninterrupted bead or layer 36, 40, of adhesive material is provided between the body flange 24 and the inner surface of the windshield 14 adjacent the edge portion thereof, as shown in FIGURE 3.

When the windshield 14 is rotated within the windshield opening, it is located laterally of the flange 24 by the previously mentioned spacer buttons or spacer means of the locating jigs or fixtures. Clamps are then provided between the body pillars and the side edge portions of the windshield 14 to hold the windshield against these spacer buttons and thereby accurately locate the windshield laterally of the windshield opening. In the specific embodiment shown, the locating jigs or fixtures applied to the body locate the inner surface of the windshield 14 approximately 3/16 of an inch from the adjacent surface of the body flange 24. The windshield jig or fixture is then removed since it is no longer necessary.

Thereafter, a plurality of clips 44 are inserted in the space between the body wall 12 and the edge portion of the windshield 14. The details of these clips are shown in FIGURE 10.

Each clip includes a generally flat body or base portion 46 terminating at one end thereof in a lateral flange 48 and at the other end thereof in an ogee-shaped portion 50 which provides for the mounting of the reveal moldings as will be described. A spring biased wing or flange 52 extends laterally from each side of the body 46, with the wings 52 being arcuate both longitudinally and transversely thereof. The end portions 54 of the wings are dipped or otherwise provided with a coating of a suitable plastic material to prevent noise since the end portions 54 engage the edge portion of the windshield.

When the clips 44 are inserted in the space between the body wall 12 and the edge portion of the windshield, the flanges 48 and a portion of the bodies 46 of the clips become embedded in the bead or layer 36, 40, of adhesive material on the wall 12 and flange 24. As shown in FIGURE 3, although exaggerated for purposes of clarity, a thin film of the bead or layer 36, 40, of adhesive material remains between the flanges 48, which act as limit stops to locate the clips with respect to the windshield 14, and the adjacent body flange 24. The wings 52 of the clips are spring biased toward the edge portion of the windshield and the coated ends 54 of these wings resiliently engage the windshield. The clips 44 function to mount the reveal moldings on the body as will be hereinafter described.

After the clips 44 have been inserted and embedded within the bead or layer 36, 40, of adhesive material the body is passed through a suitable oven to cure the bead or layer 36, 40, of adhesive material. While the bead or layer 36, 40, need not be completely cured, it should be cured to an extent so that it will have a tack-free skin. The passing of the body through an oven reduces the curing time to a minimum, although it will be remembered that this adhesive material will also cure under ambient temperature conditions, although a longer time will be required. After the bead or layer 36, 40, has been provided with a tack-free skin, the locating jigs or fixtures and the clamps are removed since the windshield 14, the blocks 38 and the clips 44 are fixed in place.

The reveal molding 56, as shown in FIGURES 3 and 9, is generally of L-shaped cross section and the one leg 57 thereof terminates in a return bent arcuate flange 58 adapted to resiliently bear against the windshield 14. The other leg 60 of the molding has a short lateral terminal flange 62 which is adapted to be received within the innermost bead of the ogee-shaped portion 50 of the clips so as to retain the reveal molding 56 in place on the body. Normally, the legs 57 and 60 are at a lesser angle than as shown in the drawings, and when the molding is mounted on the body, by inserting the leg 60 between the ogee-shaped portions 50 of the clips and the body wall 12, the leg 57 is slightly rotated outwardly by engagement with the windshield to resiliently hold the flange 58 in tight rattle-free engagement with the windshield. The reveal molding 56 conceals the clips 44, the bead or layer 36, 40, of adhesive material, the blocks 38, the body wall 12, and the body flange 24 from view from the exterior of the body.

An inner garnish molding 64 is provided along the upper and side edge portions of the windshield opening to conceal the body flange 24, the bead or layer 36, 40, of adhesive material and the clips 44 from view from the interior of the body. Along the lower edge portion of the windshield opening, the instrument panel 66 may bear against the member 30 to function in the same manner as the garnish molding.

This invention obviates most of the difficulties in sealing the windshield to the windshield opening and preventing the entry of either moisture or other ambient material. Inasmuch as the bead or layer 36, 40, of adhesive material is continuous around the entire windshield opening, it provides a continuous uninterrupted seal between the inner surface of the windshield and the body flange and is effective under all climatic conditions to seal the windshield opening. Tests of a vehicle body having the windshield mounted thereon in accordance with this invention, as compared to present practice, have indicated significant increases in body rigidity as well as a substantial decrease in windshield opening distortion due to both bending and torsional moments. Thus, in some respects, the windshield becomes a structural part of the body. The adhesive material, once cured, has several of the properties of rubber, one of which is limited flexibility so as to allow the windshield to move relative to the body flange as the cured adhesive material acts in shear. Thus, the panel can still move relative to the body within a limited extent even though it functions as a load-carrying part of the body structure.

While certain specific adhesive materials have been described herein, this invention is not limited to such particular adhesive materials and any other suitable adhesive material may be used. There are, of course, certain limitations to the adhesive material since it must wet both glass and painted metal surfaces and must retain some degree of flexibility once cured.

Removal of the windshield may be easily accomplished by piercing a hole in the bead or layer 36, 40, of adhesive material, inserting a wire through this hole, and then using the wire as a saw to cut the bead around the windshield.

A modification of the invention is shown in FIGURE

11. When it is desired to avoid the use of the locating jigs or fixtures applied to the body inwardly of the windshield opening, suitable spacers 70 may be applied to the body structure so as to dispense with these jigs or fixtures. The spacers 70 are generally of Z shape, including a mounting flange 72 adapted to be secured in a suitable manner such as by screws 74 to leg 32 of member 30, an intermediate portion 76 bearing against the flange 24, and a terminal flange 78 projecting outwardly of the body over the flange 24 into engagement with the windshield 14 to thereby space the windshield with respect to the flange 24. Suitable reinforcing ribs 80 may be formed integrally with the member 70 to prevent bending of the intermediate portion 76 relative to the mounting flange 72 due to the weight of the windshield 14. It will be understood that the spacers 70 are secured to the body structure along the top, the bottom, and the sides of the windshield opening.

On an automobile production line, it is necessary that the locating jigs or fixtures be removed at one particular point on the line. If the bead or layer 36, 40, of adhesive material has not been fully cured when the jigs or fixtures are removed, it is possible for the windshield to shift. By use of the spacers 70, the jigs or fixtures can be dispensed with. Inasmuch as the spacers 70 are not removed after installation, it may be possible to dispense with passing the bodies through an oven to accelerate curing of the adhesive material since the elapsed time that the body is on the production line may be sufficient to allow the bead of adhesive material to cure prior to the time that the body is removed from the production line. Various touch-up paint operations, which require passing the body through an oven, will accelerate the curing of the adhesive material and the temperatures therein are usually not sufficient to soften the members 70, if they are made of plastic material, as contemplated in the specific embodiment shown.

While the invention has been described with reference to a body windshield and with respect to a body wall and a body flange, it is easily applicable to other fixed vehicle windows, such as backlites, and to other vehicle bodies which may not include a body wall and a flange but may include a pair of body walls located laterally or normal to each other.

Thus, this invention provides a new and improved method of and means for mounting transparent panels on vehicle bodies.

What is claimed is:

1. A method of installing a transparent panel within a vehicle body opening defined by a first wall extending laterally to the plane of said opening and a second wall extending laterally to said first wall and generally parallel to the plane of said opening comprising, adhesively securing a plurality of panel support means to said second wall, applying a bead of adhesive material to the inner surface of said panel adjacent the edge thereof, locating said panel generally angularly outwardly of the plane of said opening with the lower edge portion thereof resting on said panel support means, rotating said panel into the plane of said opening and within said first wall to bring said bead of adhesive material into contact with said second wall, and inserting resilient spacer means between the edge portion of said panel and said first wall after said panel has been rotated within the plane of said opening.

2. A method of installing a transparent panel within a generally vertically disposed vehicle body opening defined by a first wall extending laterally to the plane of said opening and a second wall extending laterally to said first wall comprising, providing a plurality of panel support means on said first wall along the lower edge portion of said opening adjacent said second wall and below the edge portion thereof, applying a bead of curable adhesive material to the inner surface of said panel adjacent the edge portion thereof, locating said panel generally angularly outwardly of the plane of said opening with the lower edge portion thereof resting on said panel support means, rotating said panel into the plane of said opening and within said first wall to bring said bead of adhesive material directly into contact with said second wall entirely around said opening and above said panel support means along the lower edge portion of said opening, locating the inner surface of said panel with respect to said second wall to space said panel within said opening, providing molding support members on said body between the lower edge portion of said panel and said first wall intermediate said panel support means, providing other molding support members between the other edge portions of said panel and said first wall, and curing said adhesive material.

3. The method as recited in claim 2 wherein adhesive material is applied to said first wall and said second wall along the lower edge portion of said opening and said panel support means are embedded in the adhesive material to secure said panel support means to said body.

4. The method as recited in claim 2 wherein adhesive material is applied to said first wall and said second wall along the lower edge portion of said opening, said panel support means are embedded within said adhesive material, and said molding support members are embedded in said adhesive material.

5. In combination with a vehicle body having a closure opening therein defined by a generally continuous first wall extending laterally to the plane of said opening and a second wall extending laterally to said first wall, a plurality of panel support means located on said first wall adjacent said second wall along the lower edge portion of said opening, said panel support means having an upper surface located below the upper edge portion of said second wall, a panel of a size to close said opening, said panel having the lower edge portion thereof engaging and being supported by said panel support means and being adapted to be directly secured to said second wall around the entire edge portion of said opening, molding support members mounted on said body and including molding support portions extending outwardly of the edge portion of said panel from between the edge portion of said panel and said first wall, and a continuous bead of cured adhesive material securing said panel support means to said first and second walls and directly securing said panel to said second wall.

6. The combination recited in claim 5 wherein said panel support means include a plurality of blocks of resilient material spaced along said first wall along the lower edge portion of said opening.

References Cited in the file of this patent

UNITED STATES PATENTS

| | | |
|---|---|---|
| 2,497,261 | Hicks | Feb. 14, 1950 |
| 2,554,058 | Phipps | May 22, 1951 |
| 2,617,159 | Leighton | Nov. 11, 1952 |
| 2,736,067 | Boschi | Feb. 28, 1956 |